United States Patent
Jetton et al.

(10) Patent No.: US 8,690,588 B2
(45) Date of Patent: Apr. 8, 2014

(54) JUNCTION BOX ASSEMBLY HAVING AN OVER-TRAVEL SPRING

(75) Inventors: James Thomas Jetton, Ann Arbor, MI (US); Eric Scott Smolen, Commerce, MI (US); Jason Robert Degen, Plymouth, MI (US)

(73) Assignee: Yazaki North America, Inc., Canton, MI (US)

( * ) Notice: Subject to any disclaimer, the term of this patent is extended or adjusted under 35 U.S.C. 154(b) by 91 days.

(21) Appl. No.: 13/331,410

(22) Filed: Dec. 20, 2011

(65) Prior Publication Data

US 2013/0153288 A1 Jun. 20, 2013

(51) Int. Cl.
*H05K 1/00* (2006.01)

(52) U.S. Cl.
USPC .......................................... 439/76.2; 439/948

(58) Field of Classification Search
USPC ........ 439/76.2, 949, 354, 350, 357, 948, 680; 174/50, 53, 57–59, 520
See application file for complete search history.

(56) References Cited

U.S. PATENT DOCUMENTS

| | | | |
|---|---|---|---|
| 5,285,011 A * | 2/1994 | Shimochi | 174/59 |
| 5,443,401 A * | 8/1995 | Champion et al. | 439/680 |
| 5,775,953 A * | 7/1998 | Yamanashi et al. | 439/701 |
| 5,777,843 A | 7/1998 | Younce | |
| 5,915,978 A | 6/1999 | Hayakawa et al. | |
| 6,270,360 B1 | 8/2001 | Yanase | |
| 6,332,812 B1 * | 12/2001 | Kazuhara | 439/701 |
| 6,379,195 B1 | 4/2002 | Torikoshi et al. | |
| 6,443,779 B2 * | 9/2002 | Suzuki | 439/701 |
| 6,488,551 B1 | 12/2002 | Tomlin et al. | |
| 6,875,028 B2 * | 4/2005 | Kita et al. | 439/76.2 |
| 6,992,248 B1 | 1/2006 | Dunbar et al. | |
| 7,118,390 B2 | 10/2006 | Kita | |
| 7,499,262 B1 | 3/2009 | Darr | |
| 7,717,720 B2 * | 5/2010 | Ikeda | 439/76.2 |
| 7,891,987 B2 * | 2/2011 | Takeuchi | 439/76.2 |
| 8,002,569 B2 | 8/2011 | Ikeda et al. | |
| 2006/0209499 A1 | 9/2006 | Rowe et al. | |
| 2011/0080058 A1 | 4/2011 | Ikeda et al. | |

* cited by examiner

*Primary Examiner* — Boris L. Chervinksy
*Assistant Examiner* — Pete Lee
(74) *Attorney, Agent, or Firm* — Harness, Dickey & Pierce, P.L.C.

(57) ABSTRACT

A junction box assembly includes a housing member and an electrical component. The housing member has a housing surface and a component receptacle having a pair of opposing sidewalls coupled to the housing surface. Each sidewall has a locking opening disposed therein and each locking opening defines a locking surface. A post is arranged within the component receptacle and extends from the housing surface for a predetermined distance to a post surface. The electrical component is received in the component receptacle and has a component surface adjacent the post surface and a barb received in each locking opening. The post applies a force to the electrical component for retaining the barb against the locking surface.

14 Claims, 6 Drawing Sheets

JUNCTION BOX ASSEMBLY HAVING AN OVER-TRAVEL SPRING

FIELD

The present disclosure relates to junction box assemblies and, more particularly, to a junction box assembly having an over-travel spring.

BACKGROUND

Certain vehicle components require high voltages and currents that, in turn, demand high power switching and fusing. Junction box assemblies are designed to distribute the necessary power from the vehicle's main power source (i.e., a battery or fuel cell) to these vehicle components in order to provide such requirements. The junction box assembly safeguards against electrical arcing between connections and protects circuits from external elements, while maintaining these high powered connections.

Figure 7:
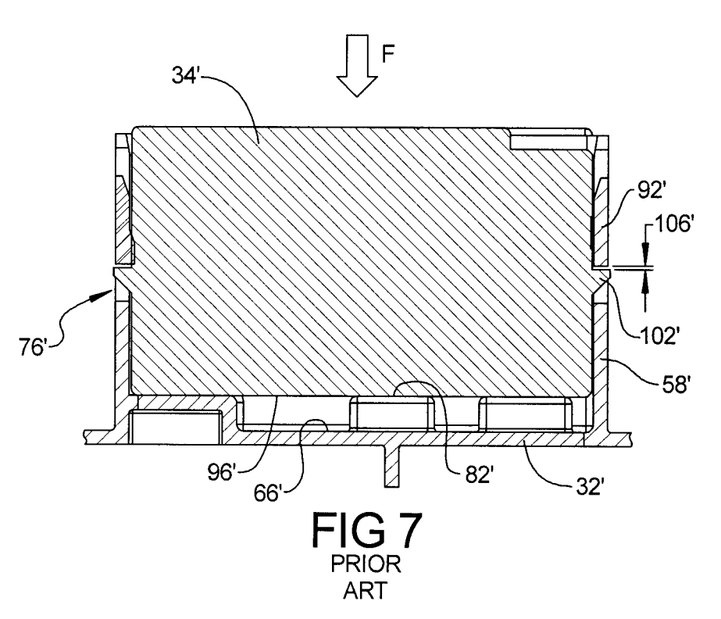
FIG. 7 is a view similar to that of FIG. 5B but taken through a conventional junction box assembly.

As shown in FIG. 7, the junction box assembly typically includes a housing member 32' having a plurality of electrical components (e.g., an electrical component 34') secured thereto. The electrical component 34' includes a pair of barbs 102' for fixedly but releasably securing the component 34' to a component receptacle 58' of the housing member 32'. The component 34' may be inserted into the component receptacle 58' so as to align the barbs 102' with corresponding locking openings 76'. When a depressing force F is applied to the component 34', the barbs 102' may force locking tabs 92' in the locking openings 76' to move resiliently outwardly from the component receptacle 58'.

Contact between a terminal surface 82' and a lower surface 96' of the component 34' prevents further movement of the component 34' into the component receptacle 58' and as such, the component 34' does not touch a surface 66' of the housing member 32'. At this point, the barbs 102' may be fully seated in the locking openings 76' allowing the locking tabs 92' to spring back to their original position and leaving a gap 106' between the locking tabs 92' and the barbs 102'. Accordingly, the component 34' allows for some relative motion, such as at gap 106', between the component 34' and the housing member 32' in order to guarantee that the barbs 102' may be seated within the locking openings 76'.

SUMMARY

This section provides a general summary of the disclosure, and is not a comprehensive disclosure of its full scope or all of its features.

In one form, the teachings of the present disclosure provide a junction box assembly including a housing member and an electrical component. The housing member includes a housing surface. A component receptacle having a pair of opposing sidewalls coupled to the housing surface. Each sidewall has a locking opening disposed therein and each locking opening defines a locking surface. A post is arranged within the component receptacle and extends from the housing surface for a predetermined distance to a post surface. The electrical component is received in the component receptacle and has a component surface adjacent the post surface and a barb received in each locking opening. The post applies a force to the electrical component for retaining the barb against the locking surface.

In another form, the teachings of the present disclosure provide a junction box assembly including a housing surface having a post extending therefrom. A pair of sidewalls extend from the housing surface. The housing surface and the sidewalls cooperate to form a component receptacle about the post. A locking opening is formed through each of the sidewalls. Each sidewall comprises a locking tab that abuts a corresponding one of the locking openings so as to define an edge of the corresponding one of the locking openings on a side of the corresponding one of the locking openings that is opposite the housing surface. An electrical component is received within the component receptacle. The electrical component includes a pair of barbs removably received within the locking openings. The post abuts the electrical component and the barbs abut the locking tabs.

In yet another form, the teachings of the present disclosure provide a method for securing an electrical component to a junction box assembly. Initially, an electrical component is inserted into a component receptacle on a housing member of the junction box assembly. The electrical component is then depressed with a force to a depth that allows a barb of the electrical component to seat within a locking opening of the component receptacle. The depressing force is then removed from the electrical component. A post secured to the wall of the housing member then moves the electrical component in a direction opposite the depressing force so as to bring the barb in contact with a locking tab in the locking opening.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only and not all possible implementations, and are not intended to limit the scope of the present disclosure.

Corresponding reference numerals indicate corresponding parts throughout the several views of the drawings.

DETAILED DESCRIPTION

Figure 1:
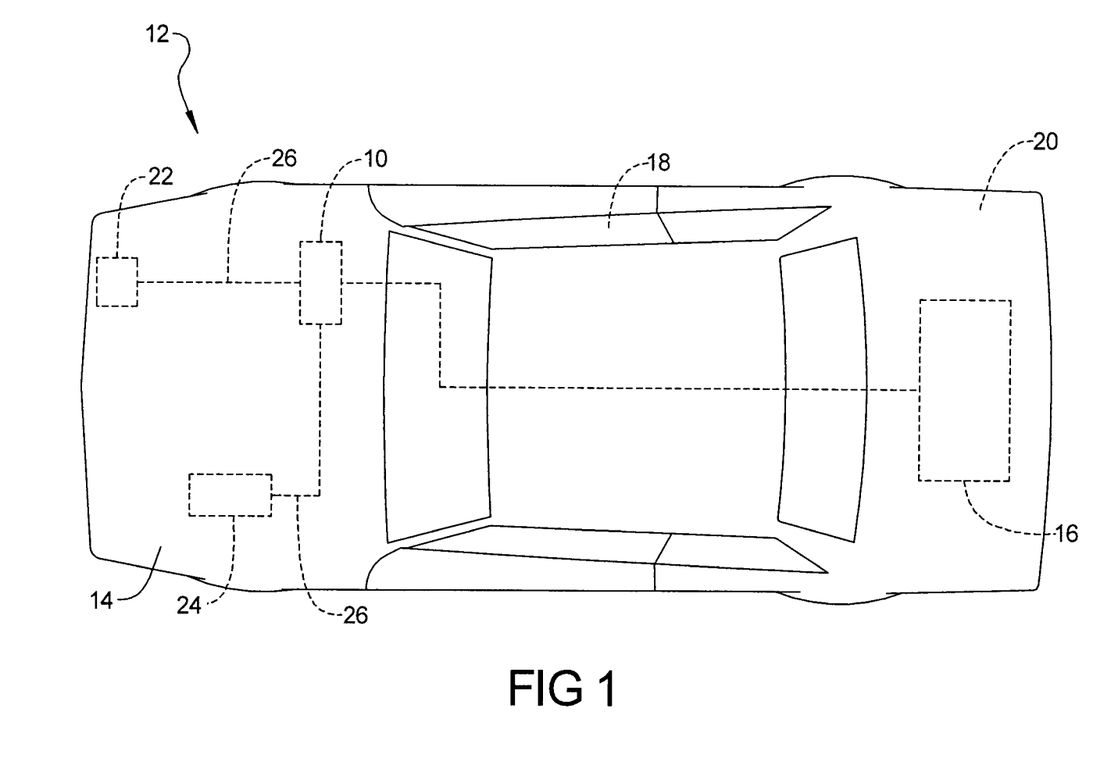
FIG. 1 is a schematic view of a vehicle having a junction box assembly constructed in accordance with the teachings of the present disclosure.

With reference to FIG. 1 of the drawings, a junction box assembly constructed in accordance with the teachings of the present disclosure is generally indicated at reference numeral 10. The junction box assembly 10 can be located within a vehicle 12, such as within an engine compartment 14, a battery pack 16, a passenger compartment 18, and/or a trunk 20. The junction box assembly 10 may be operable for distributing power provided by a power source (e.g., the battery pack 16 or a fuel cell) to a variety of loads within the vehicle 12.

The junction box assembly 10 may be used, for example, to drive a lamp 22 (e.g., incandescent, High Intensity Discharge (HID), Xenon) and/or a device motor 24 (e.g., steering motor, washer pump motor) via conduit lines 26. It should be understood that the junction box assembly 10 may be used to drive loads having a variety of advanced diagnostics (e.g., outage detection, overload sensing) and/or drive features (e.g., pulse width modulation (PWM), direct current (DC)). Furthermore, the junction box assembly 10 may act as a junction point for modularizing the conduit lines 26 and reducing the number of splices needed for driving the aforementioned electrical loads.

Figure 2:
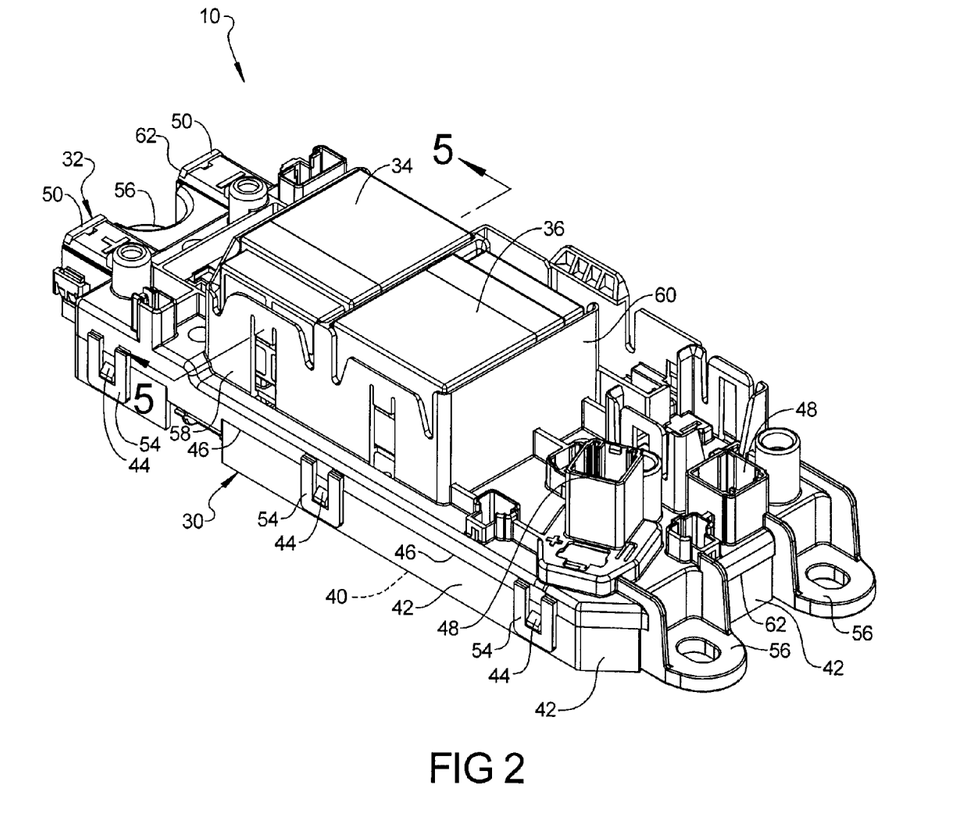
FIG. 2 is a perspective view of the junction box assembly of FIG. 1.

With reference now to FIG. 2, the junction box assembly 10 may include a first housing member 30, a second housing member 32, and a plurality of electrical components (e.g., contactors 34, 36). The first and second housing members 30, 32 may be conventionally manufactured, such as by injection molding a non-conductive polymeric material, such as a thermoplastic. Although the junction box assembly 10 is depicted as being substantially rectangular, it should be understood that any appropriate shape may be used for packaging within the vehicle 12 (FIG. 1).

The first housing member 30 may include a bottom wall 40, a plurality of sidewalls 42 extending from an outer edge of the bottom wall 40, and a plurality of locking protrusions 44 arranged near an upper edge 46 of the sidewalls 42. The first housing member 30 may contain various electrical componentry, as is known in the art. For example, the first housing member 30 may have a bus bar (not shown) in electrical communication with the contactors 34, 36. Furthermore, the bus bar may be electrically connected to the power source 16 (FIG. 1) and/or the various electrical systems (e.g., lamp 20 (FIG. 1)) through the conduit lines 24 extending to or from battery interfaces 48 and vehicle bus interfaces 50.

The second housing member 32 may include a plurality of u-shaped extension tabs 54, a plurality of fixation bosses 56, and at least two component receptacles 58, 60. The extension tabs 54 may extend axially away from the second housing member 32 towards the first housing member 30 and may be located to correspond with the locking protrusions 44 so as to be spaced along sides of the junction box assembly 10. Furthermore, the extension tabs 54 may be sufficiently thin so as to resiliently bend for receipt of the locking protrusions 44 during assembly of the first and second housing members 30, 32, as is known in the art.

The fixation bosses 56 may be located along ends 62 of the second housing member 32 for receiving a fastener to secure the junction box assembly 10 to the vehicle 12 (FIG. 1). While the junction box assembly 10 is shown as having three fixation bosses 56, it should be understood that any number of fixation bosses 56 may be used. The first housing member 30 may also include mating fixation bosses (not shown) aligned with the fixation bosses 56 of the second housing member 32 to further support the junction box assembly 10 in the vehicle 12 (FIG. 1).

Figure 3:
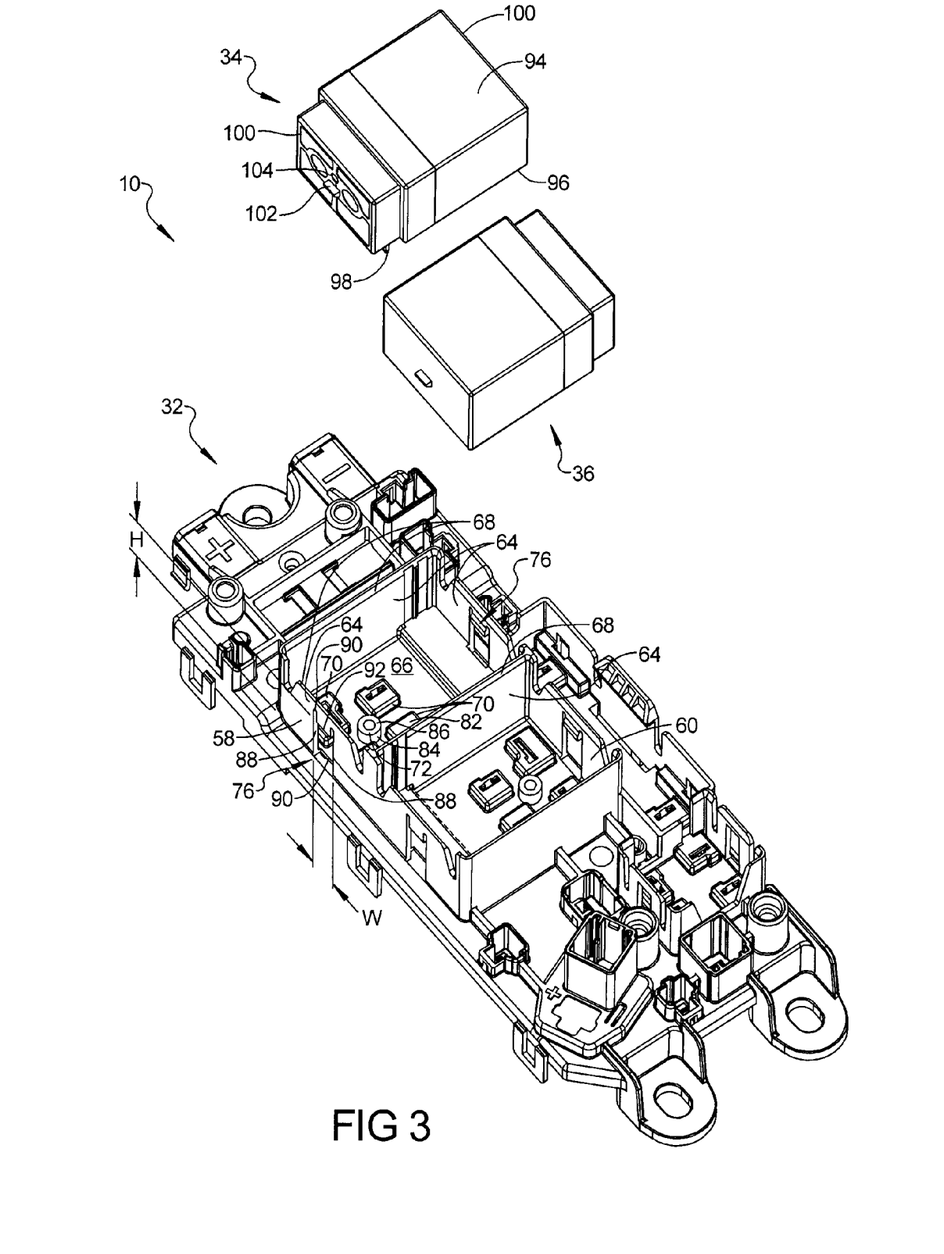
FIG. 3 is an exploded view of a housing member and a pair of electrical components of the junction box assembly of FIG. 1.
Figure 4:
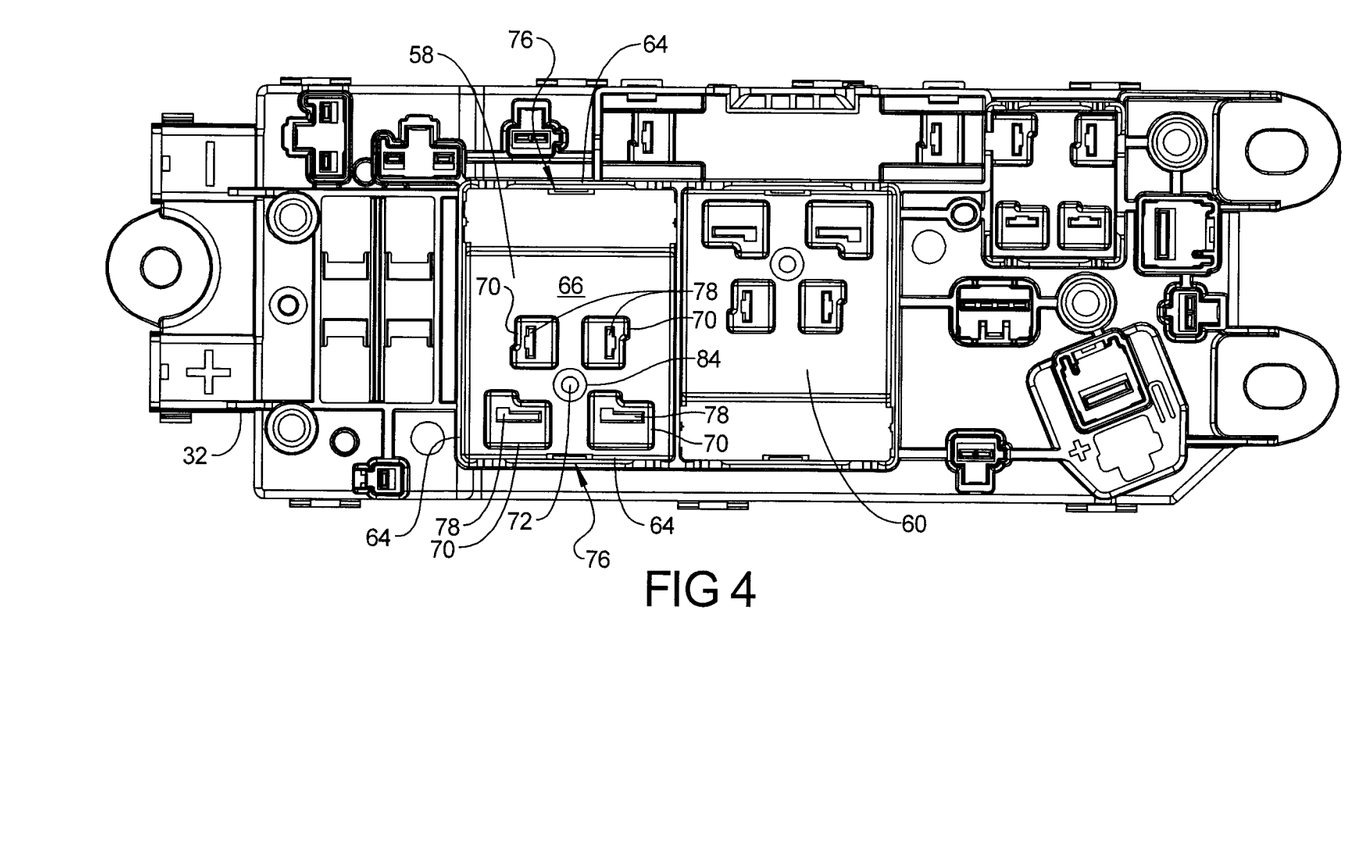
FIG. 4 is a top plan view of a portion of the junction box assembly illustrating the housing member in more detail.

With reference now to FIGS. 3 and 4, the component receptacles 58, 60 may be integrally formed with the second housing member 32 for receiving the contactors 34, 36 (FIG. 3), respectively. As the component receptacles 58, 60 and corresponding contactors 34, 36 (FIG. 3) are substantially similar, the following description will be directed only to component receptacle 58 and contactor 34 (FIG. 3), with an understanding that the description can equally apply to component receptacle 60 and contactor 36 (FIG. 3). Accordingly, the component receptacle 58 may have adjoined sidewalls 64 extending upwardly from a housing surface 66 to an edge 68 (FIG. 3) of the sidewalls 64, a plurality of terminal cavities 70 and a spring post 72 extending from the housing surface 66, and a pair of locking openings 76 in opposing sidewalls 64. Each terminal cavity 70 may have a conductive terminal 78 (FIG. 4) centrally disposed therein. The terminal cavities 70 may be integrally molded with the second housing member 32 and may extend from the housing surface 66 and into the component receptacle 58 a predetermined distance D1 (e.g., distance of 5.0 mm nominal; as best shown in FIG. 5B) to terminate at a terminal surface 82. The conductive terminals 78 (FIG. 4) extending into the terminal cavities 70 may be used to electrically couple the contactor 34 to the electrical componentry of the first housing member 30 (FIG. 2).

The spring post 72 may also be integrally molded with the second housing member 32, for example, by shortening an ejector pin during molding. In this way, the spring post 72 may have a substantially cylindrical body 84 extending from the housing surface 66 by a predetermined distance D2 (e.g., distance of 6.3 mm nominal; as best shown in FIG. 5B) into the component receptacle 58 and terminating at a post surface 86. The distance D2 may be greater than the distance D1 (e.g., by approximately 1.3 mm). While shown as being cylindrical, the spring post 72 may have any alternate polygonal configuration, such as rectangular. Furthermore, while not shown, the component receptacle 58 may also have more than one spring post 72 located therein.

Figure 5A:
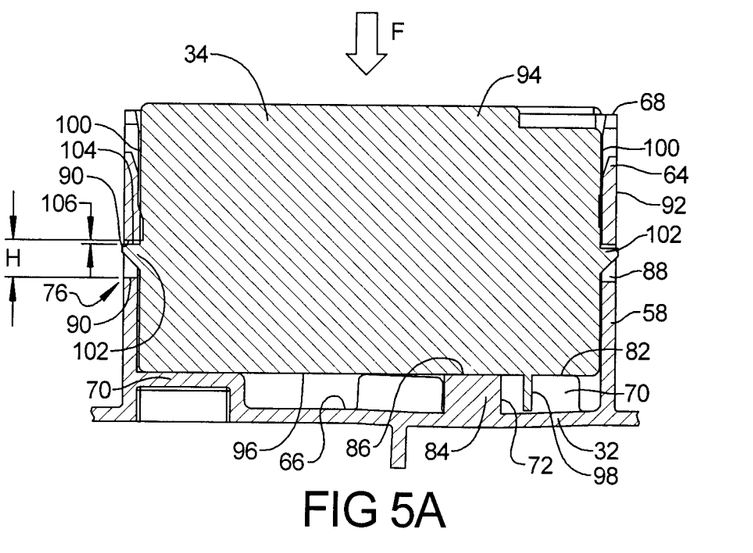
FIGS. 5A and 5B are section views taken along the line 5-5 of FIG. 2, depicting attachment of an electrical component to a component receptacle of the housing member.
Figure 5B:
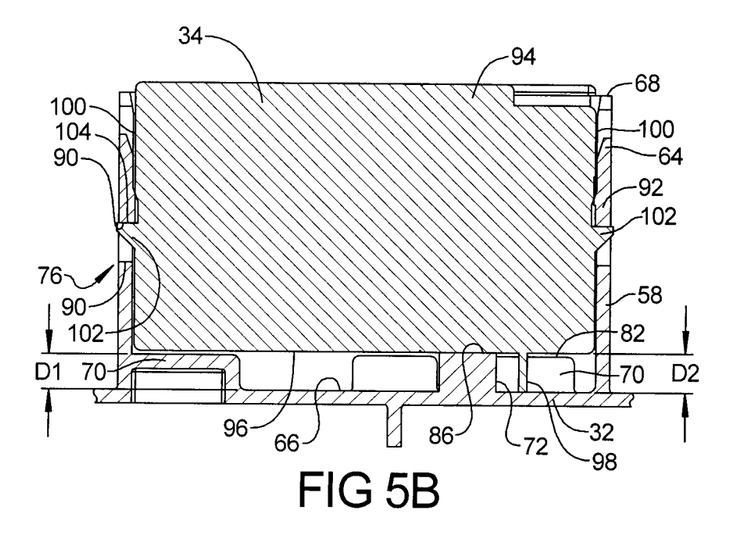

With reference now to FIGS. 3 and 5A, the locking openings 76 may be defined by opposing longitudinal and latitudinal ends 88, 90 that establish a polygonal opening (e.g., rectangular) within opposing sidewalls 64. One of the latitudinal ends 90 nearest to the edge 68 of the sidewall 64 may extend to a locking tab 92. The locking tab 92 may be integrally formed with the sidewall 64 and may resiliently extend into the component receptacle 58. The locking openings 76 may have a predetermined height H and width W for receipt of a portion of the contactor 34, as will be described in more detail below.

The contactor 34 may have a device body 94 sized to fit within the component receptacle 58. The device body 94 may further define a lower surface 96, a plurality of terminals 98 extending from the lower surface 96, and opposing side faces 100 each having a barb 102 extending therefrom. The plurality of terminals 98 correspond in size, location, and number to the mating terminal cavities 70 of the component receptacle 58. Each barb 102 may have a substantially triangular profile such that a face 104 of the barb 102 is substantially planar and parallel to the latitudinal ends 90 of the corresponding locking opening 76. The function of the contactor 34 is conventional, and accordingly, it will not be described in detail herein.

Attachment of the contactor 34 to the component receptacle 58 will now be described with reference to FIGS. 5A and 5B. The contactor 34 may be inserted into the component receptacle 58 so as to align the barbs 102 with the locking openings 76, as shown in FIG. 5A. When a depressing force, as shown by force arrow F is applied to the contactor 34, the barbs 102 may force the locking tabs 92 to move resiliently outwardly from the component receptacle 58. As the contactor 34 is depressed downwardly toward the housing surface 66 of the second housing member 32, the lower surface 96 of the contactor 34 is brought into contact with the post surface 86 of the spring post 72 and the plurality of terminals 98 are brought into engagement with the mating terminal cavities 70. While the depressing force F continues to be applied, it is transmitted through the spring post 72 to the second housing member 32. This force causes the material of the second housing member 32 near the post 72 to deform or resiliently deflect.

The contactor 34 is seated in the component receptacle 58 when the terminals 98 are seated within their respective terminal cavity 70 (i.e., when the upper terminal surface 82 contacts the lower surface 96 of the contactor 34). At this point, the barbs 102 may be fully seated in the locking openings 76 allowing the locking tabs 92 to spring back to their original position. In this position, the locking tabs 92 may have the latitudinal end 90 of the locking opening 76 aligned over the face 104 of the barbs 102 with a gap 106 between an end of the locking tab 92 and the surface 104 (e.g., gap 106 is approximately equal to 0.5 mm).

The depressing force F can then be removed from the contactor 34 allowing the second housing member 32 to bias the spring post 72 back into position, as shown in FIG. 5B. Movement of the spring post 72, in turn, may move the contactor 34 in a direction opposite the depressing force F so as to bring the barbs 102 into contact with the locking tabs 92 in the locking openings 76. In other words, the end of the locking tab 92 is flush with the face 104 of the barbs 102 so that the gap 106 no longer exists. In this way, the second housing member 32 near the spring post 72 can behave as a trampoline or over-travel spring under the contactor 34. Furthermore, the spring post 72 can stabilize the contactor 34 while still allowing for insertion over-travel.

Figure 6:
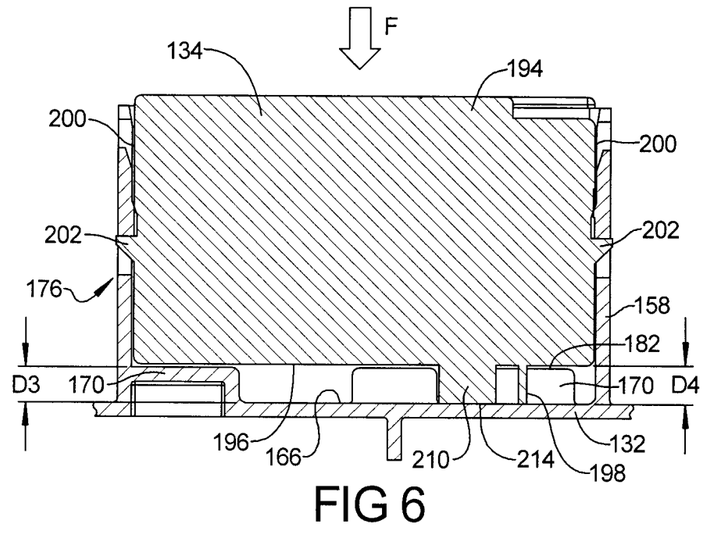
FIG. 6 is a view similar to that of FIG. 5B but showing an alternate electrical component and component receptacle for the housing member.

With reference now to FIG. 6, an alternately configured housing member 132 is shown receiving an electrical component (e.g., contactor 134). The housing member 132 may have a housing surface 166 from which a component receptacle 158 and a plurality of terminal cavities 170 extend. The component receptacle 158 may further include locking openings 176, configured substantially similarly to the locking openings 76. The terminal cavities 170 may be integrally molded with the housing member 132 and may extend from the housing surface 166 into the component receptacle 158 a predetermined distance D3 to terminate at a terminal surface 182 (e.g., distance of 5.0 mm nominal). As can be seen, the component receptacle 158 is substantially similar to the component receptacle 58; however, the component receptacle 158 omits the spring post 72.

The contactor 134 may have a device body 194 sized to fit within the component receptacle 158. The device body 194 may define a lower surface 196, a plurality of terminals 198 extending from the lower surface 196, and opposing side faces 200 each having a barb 202 extending therefrom. Notably, the device body 194 may also include a post 210 extending from the lower surface 196. The post 210 is substantially similar in configuration and function to the spring post 72. For example, the post 210 may be substantially cylindrical, may extend from the device body 194 by a predetermined distance D4 (e.g., distance of 6.3 mm nominal), and may terminate at a post surface 214. The distance D4 may be greater than the distance D3 (e.g., by approximately 1.3 mm). While shown as being cylindrical, the post 210 may have any alternate polygonal configuration, such as rectangular. Furthermore, while not shown, the device body 194 may also have more than one post 210 extending therefrom.

The contactor 134 is attached to the component receptacle 158 as previously described above. For example, the contactor 134 may be inserted into the component receptacle 158 so as to align the barbs 202 with the locking openings 176. As the contactor 134 is depressed downwardly toward the housing surface 166, the post surface 214 on the contactor 134 is brought into contact with the housing surface 166 and the plurality of terminals 198 are brought into engagement with the mating terminal cavities 170. While the force is applied to the contactor 134, it is transmitted through the post 210 to the housing member 132 at the housing surface 166. This force causes the material of the housing member 132 near the post 210 to deform or resiliently deflect.

The contactor 134 is seated in the component receptacle 158 when the terminals 198 are seated within their respective terminal cavity 170 (i.e., when the upper terminal surface 182 contacts the lower surface 196 of the contactor 134). At this point, the barbs 202 may be fully seated in the locking openings 176. The depressing force F can then be removed from the contactor 134 allowing the housing surface 166 to bias back into position. Movement of the housing surface 166, in turn, moves the post 210 and attached contactor 134 in a direction opposite the depressing force F. In this way, the housing member 132 that comes in contact with the post 210 can behave as a trampoline or over-travel spring under the contactor 134. Furthermore, the post 210 can stabilize the contactor 134 while still allowing for insertion over-travel.

The foregoing description has been provided for purposes of illustration and description. These examples are provided so that this disclosure will be thorough, and will fully convey the scope to those who are skilled in the art. Numerous specific details have been set forth such as examples of specific components, devices, and methods, to provide a thorough understanding of the present disclosure. It should be apparent to those skilled in the art that specific details need not be employed, that examples may be embodied in many different forms and that neither should be construed to limit the scope of the disclosure. In some examples, well-known processes, well-known device structures, and well-known technologies are not described in detail. For example, additional electrical components, such as relays or fuses, may also be received within appropriately sized component receptacles. Additionally, while only two contactors 34, 36 are shown within the second housing member 32, it should be understood that any number of electrical components may be included with the junction box assembly 10.

Furthermore, the terminology as used herein is for the purpose of describing particular examples only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations as described herein are not to be construed as necessarily requiring their performance in the particular order discussed or illustrated, unless specifically identified as an order of performance. It is also to be understood that additional or alternative steps may be employed.

When an element or layer has been referred to as being "connected," or "coupled to" another element or layer, it may be directly on, engaged, connected, or coupled to the other element or layer, or intervening elements or layers may be present. Other words used to describe the relationship between elements should be interpreted in a like fashion (e.g., "adjacent," etc.). As used herein, the term "and/or" includes any and all combinations of one or more of the associated listed items.

Although the terms first, second, third, etc. may have been used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the examples.

Spatially relative terms, such as "inner," "outer," "lower," "upper," and the like, may have been used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "beneath" other elements or features would then be oriented "above" the other elements or features. Thus, the example term "beneath" can encompass both an orientation of above and below. The device may be otherwise oriented (rotated 90 degrees or at other orientations) and the spatially relative descriptors used herein interpreted accordingly.

What is claimed is:

1. A junction box assembly comprising: a housing member including: a housing surface; a component receptacle having a pair of opposing sidewalls coupled to the housing surface, each sidewall having a locking opening disposed therein and each locking opening defining a locking surface; and a post arranged within the component receptacle and extending from the housing surface for a predetermined distance to a post surface; and an electrical component received in the component receptacle, the electrical component having a component surface adjacent the post surface and a barb received in each locking opening, the post applies a force to the electrical component to the
   electrical component for retaining the barb against the locking surface; wherein the post is integrally formed with the housing surface wherein contact between the electrical component and the post surface resiliently deflects at least one of the housing surface and the post;
   wherein the housing surface biases the post against the electrical component when the at least one of the housing surface and the post is resiliently deflected due to contact between the electrical component and the post surface; and wherein the housing surface deflects the electrical component away from the component receptacle at a distance of approximately 0.5 mm in at least one location when contact is made between the electrical component and the post surface.

2. The junction box assembly of claim 1, wherein the housing member is formed from a polymeric material.

3. The junction box assembly of claim 1, wherein the electrical component is one of a relay, a contactor, and a fuse.

4. The junction box assembly of claim 1, wherein the housing member further includes a plurality of terminals extending from the housing surface to a terminal surface, wherein the terminal surface is adjacent to the component surface when the electrical component contacts the post surface.

5. A junction box assembly comprising a housing surface having a post extending therefrom; a pair of sidewalls extending from the housing surface, the housing surface and the sidewalls cooperating to form a component receptacle about the post, wherein a locking opening is formed through each of the sidewalls and wherein each sidewall comprises a locking tab that abuts a corresponding one of the locking openings so as to define an edge of the corresponding one of the locking openings on a side of the corresponding one of the locking openings that is opposite the housing surface; and an electrical component received within the component receptacle, wherein the electrical component includes a pair of barbs removably received within the locking openings, wherein the post abuts the electrical component and wherein the barbs abut the edges of the locking tabs; wherein the housing surface deflects the electrical component away from the component receptacle at a distance of approximately 0.5 mm in at least one location due to when contact is made between the electrical component and the post surface.

6. The junction box assembly of claim 5, wherein the post is integrally formed with the housing surface.

7. The junction box assembly of claim 5, wherein the electrical component is one of a relay, a contactor, and a fuse.

8. The junction box assembly of claim 5, wherein the post transmits a force between the housing surface and the electrical component.

9. The junction box assembly of claim 8, wherein the housing surface biases the post against the electrical component when the force is removed from the electrical component.

10. The junction box assembly of claim 5, further comprising a plurality of terminals extending from the housing surface to a terminal surface, wherein the terminal surface is adjacent to the component surface when the force is applied to the electrical component.

11. A method for securing an electrical component to a junction box assembly, the method comprising:
   inserting an electrical component into a component receptacle on a housing member of the junction box assembly;
   depressing the electrical component into the component receptacle with a force to a depth that (a) elastically deflects a wall of the housing member, and (b) allows a barb of the electrical component to be received within a locking opening of a locking tab to retain the electrical component within the component receptacle; and
   removing the depressing force from the electrical component to permit the housing member to move a post such that the post moves the electrical component in a direction opposite the depressing force and maintains the barb in contact with an edge of the locking opening in the locking tab; wherein a housing surface on the housing member deflects the electrical component away from the component receptacle at a distance of approximately 0.5 mm in at least one location due to contact between the electrical component and a surface of the post.

12. The method of claim 11, further comprising integrally forming the post and the wall of the housing member.

13. The method of claim 11, wherein the electrical component is one of a relay, a contactor, and a fuse.

14. A junction box assembly comprising:
   a housing surface having a post extending therefrom; a pair of sidewalls extending from the housing surface, the housing surface and the sidewalls cooperating to form a component receptacle about the post, wherein a locking opening is formed through each of the sidewalls and wherein each sidewall comprises a locking tab that abuts a corresponding one of the locking openings so as to define an edge of the corresponding one of the locking openings on a side of the corresponding one of the locking openings that is opposite the housing surface; and an electrical component received within the component receptacle, wherein the electrical component includes a pair of barbs removably received within the locking openings, and wherein the housing surface deflects the electrical component away from the component receptacle at a distance of approximately 0.5 mm in at least one location due to contact between the electrical component and a surface of the post, the deflected housing surface biasing and biases the post against the electrical component to drive the electrical component outwardly from the component receptacle such that the barbs abut the edges of the locking tabs.

\* \* \* \* \*